United States Patent
Giffel (10) Patent No.: US 8,245,175 B2
(45) Date of Patent: Aug. 14, 2012

(54) ROUTING VARIANTS IN ELECTRONIC DESIGN AUTOMATION

(75) Inventor: Barry A. Giffel, Wake Forest, NC (US)

(73) Assignee: Synopsys, Inc., Mountain View, CA (US)

( * ) Notice: Subject to any disclaimer, the term of this patent is extended or adjusted under 35 U.S.C. 154(b) by 335 days.

(21) Appl. No.: 12/605,046

(22) Filed: Oct. 23, 2009

(65) Prior Publication Data

US 2011/0029944 A1 Feb. 3, 2011

Related U.S. Application Data

(60) Provisional application No. 61/229,457, filed on Jul. 29, 2009.

(51) Int. Cl.
*G06F 17/50* (2006.01)
(52) U.S. Cl. .................. 716/126; 716/129; 716/130
(58) Field of Classification Search .................. 716/126, 716/129, 130
See application file for complete search history.

(56) References Cited

U.S. PATENT DOCUMENTS

| | | | | |
|---|---|---|---|---|
| 5,550,748 A | * | 8/1996 | Xiong | 716/129 |
| 7,580,037 B1 | * | 8/2009 | Iotov | 345/440 |
| 8,015,533 B1 | * | 9/2011 | Burstein et al. | 716/126 |

* cited by examiner

*Primary Examiner* — Vuthe Siek
(74) *Attorney, Agent, or Firm* — Park, Vaughan, Fleming & Dowler LLP; Laxman Sahasrabuddhe (57) ABSTRACT

Some embodiments provide a system that facilitates the creation of a schematic in an electronic design automation (EDA) application. During operation, the system obtains a source point and a destination point in the schematic from a user of the EDA application. Next, the system uses a line-probe-search technique to generate a set of route variants between the source point and the destination point. The system then provides the route variants to the user through a graphical user interface (GUI) in the EDA application and obtains, from the user, a selection of a route variant from the route variants through the GUI. Finally, the system uses the selected route variant as a route in the schematic.

21 Claims, 8 Drawing Sheets

ROUTING VARIANTS IN ELECTRONIC DESIGN AUTOMATION

This application claims priority to U.S. Provisional Application No. 61/229,457, entitled "Schematic Routing with Multiple Solutions," by Barry Andrew Giffel, filed 29 Jul. 2009, the contents of which are herein incorporated by reference.

BACKGROUND

1. Technical Field

This disclosure relates to electronic design automation (EDA). More specifically, this disclosure relates to techniques for generating route variants in a schematic and providing the route variants for use in the schematic.

2. Related Art

Integrated circuit design often involves the use of schematics, which typically contain logical representations of components and wires in integrated circuits. EDA tools are typically used for creating schematics. For example, a schematic editor may allow a designer to create an electronic schematic of an integrated circuit. The electronic schematic may then be used by other EDA tools to simulate the operation of the integrated circuit, create a layout of the integrated circuit, and/or detect errors in the schematic.

To create a schematic, a designer may place graphical objects corresponding to components in an integrated circuit within the schematic and draw lines between the graphical objects to represent wires electrically coupling the components. Furthermore, routing mechanisms in EDA tools may calculate routes for wires that electrically couple components in the schematic based on a set of heuristics and/or design rules for the schematic. For example, a routing mechanism may generate a route between two points in the schematic based on the existence of obstacles, wires, and/or specialized areas in the schematic.

However, routing mechanisms in EDA tools generally provide only one possible route between two points in a schematic. Furthermore, the route may differ between routing mechanisms if each routing mechanism uses a different set of heuristics to generate the route. Consequently, a designer may use an EDA tool that generates routes that may or may not be in line with the designer's preferences.

SUMMARY

Some embodiments provide a system that facilitates the creation of a schematic in an electronic design automation (EDA) application. During operation, the system obtains a source point and a destination point in the schematic from a user of the EDA application. Next, the system uses a line-probe-search technique to generate a set of route variants between the source point and the destination point. The system then provides the route variants to the user through a graphical user interface (GUI) in the EDA application and obtains, from the user, a selection of a route variant from the route variants through the GUI. Finally, the system uses the selected route variant as a route in the schematic.

The line-probe-search technique to generate the route variants can begin by radiating a set of initial probes from the source point and the destination point. Next, the system can generate one or more sets of avoidance probes based at least on obstacles encountered by the initial probes. The system can then determine a set of intersections associated with the initial probes and the avoidance probes. Specifically, a collection of initial probes and avoidance probes may be referred to as a probe set, and the system can determine a set of intersections between a probe set associated with the source point and a probe set associated with the destination point. Next, the system can generate the route variants using the intersections. In general, the probes can be radiated along any direction that is supported by the underlying design and fabrication technologies.

In some embodiments, each of the route variants contains an intersection from the intersections between a first probe associated with the source point and a second probe associated with the destination point.

In some embodiments, the initial probes are radiated in cardinal directions from the source point and the destination point. For example, on a GUI screen, the initial probes can be radiated in the up, down, left, and right directions. Note that the probe directions are not limited to the above mentioned directions. The avoidance probes can be generated perpendicularly from the initial probes that encounter the obstacles.

In some embodiments, the line-probe-search technique may incrementally create the line probe set. Specifically, the system may generate a first set of probes associated with the source point upon obtaining the source point. Next, as the user moves the cursor to the destination, the system may continuously or periodically generate route variants by treating the current location of the cursor as the destination point. Note that since the source point is fixed, the system can re-use the set of probes that was generated for the source point while the cursor moves from the source point to the destination point. Re-using the set of probes in this manner can reduce any lag that the user may have experienced while moving the cursor. Once the user specifies the destination point, the system can generate a second set of probes associated with the destination point, and use the first set of probes and the second set of probes to generate route variants.

In some embodiments, providing the route variants to the user through the GUI involves cycling through the route variants within the GUI based at least on input from the user.

In some embodiments, providing the route variants to the user through the GUI involves ordering the route variants based at least on a cost associated with each of the route variants and displaying a subset of the ordered route variants to the user.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
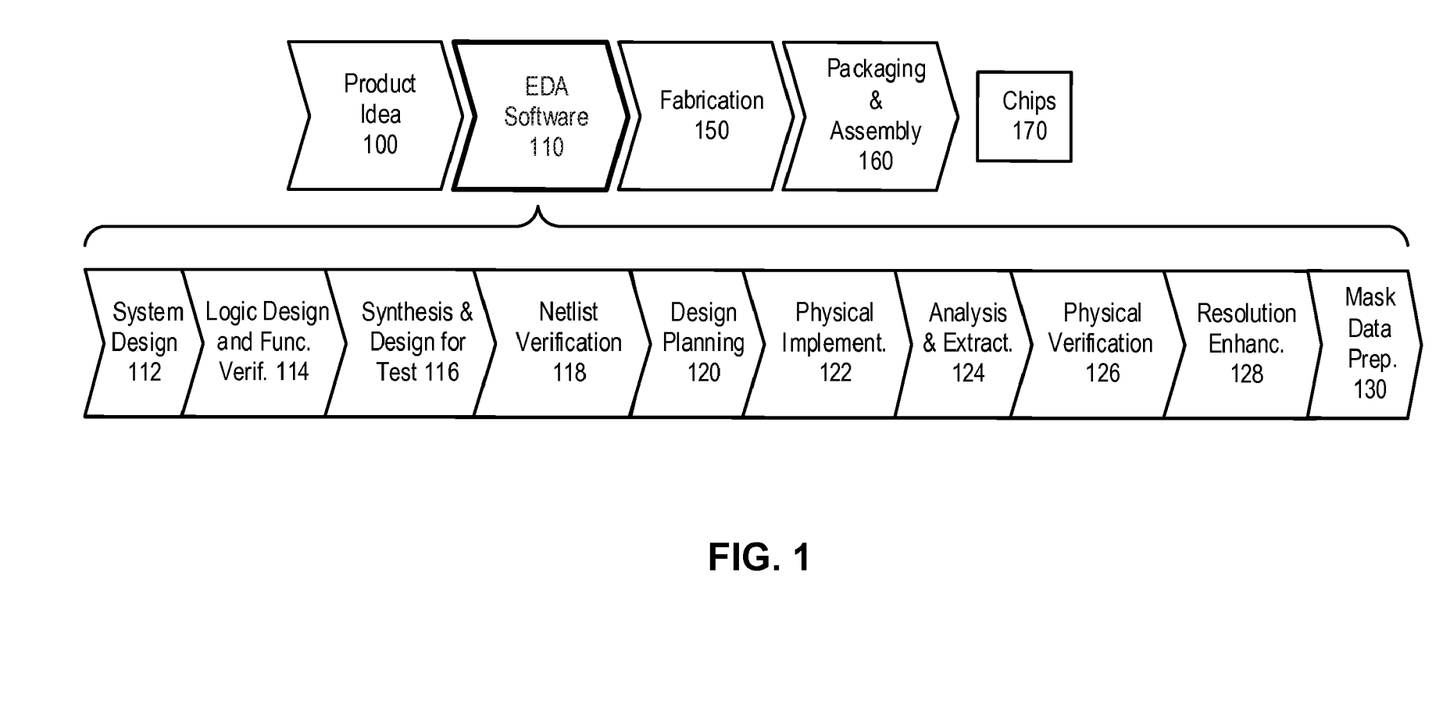
FIG. 1 shows a workflow associated with the design and fabrication of an integrated circuit in accordance with an embodiment.

FIG. 1 shows a workflow associated with the design and fabrication of an integrated circuit in accordance with an embodiment. The workflow may begin with a product idea (step 100), which may be realized using an integrated circuit that is designed using an electronic design automation (EDA) process (step 110). After the integrated circuit design is finalized, the design may undergo a fabrication process (step 150) and a packaging and assembly process (step 160) to produce chips 170.

The EDA process (step 110) includes steps 112-130, which are described below for illustrative purposes only and are not meant to limit the present invention. Specifically, the steps may be performed in a different sequence than the sequence described below.

During system design (step 112), circuit designers may describe the functionality to be implemented in the integrated circuit. They may also perform what-if planning to refine functionality, check costs, etc. Hardware-software architecture partitioning may also occur at this stage. Exemplary EDA software products from Synopsys, Inc. that may be used at this step include Model Architect, Saber®, System Studio, and DesignWare®.

During logic design and functional verification (step 114), the VHDL or Verilog code for modules in the system may be written and the design may be checked for functional accuracy (e.g., the design may be checked to ensure that it produces the correct outputs). Exemplary EDA software products from Synopsys, Inc. that may be used at this step include VCS®, Vera®, DesignWare®, Magellan™, Formality®, ESP and Leda®.

During synthesis and design for test (step 116), the VHDL/Verilog may be translated to a netlist. Further, the netlist may be optimized for the target technology, and tests may be designed and implemented to check the finished chips. Exemplary EDA software products from Synopsys, Inc. that may be used at this step include Design Compiler®, Physical Compiler®, Test Compiler, Power Compiler™, FPGA Compiler, TetraMAX®, and DesignWare®.

During netlist verification (step 118), the netlist may be checked for compliance with timing constraints and for correspondence with the VHDL/Verilog source code. Exemplary EDA software products from Synopsys, Inc. that may be used at this step include Formality®, PrimeTime®, and VCS®.

During design planning (step 120), an overall floorplan for the chip may be constructed and analyzed for timing and top-level routing. Exemplary EDA software products from Synopsys, Inc. that may be used at this step include Astro™ and IC Compiler products.

During physical implementation (step 122), circuit elements may be positioned in the layout (placement) and may be electrically coupled (routing). Exemplary EDA software products from Synopsys, Inc. that may be used at this step include Astro™ and IC Compiler products.

During analysis and extraction (step 124), the circuit's functionality may be verified at a transistor level and parasitics may be extracted. Exemplary EDA software products from Synopsys, Inc. that may be used at this step include AstroRail™, PrimeRail, PrimeTime®, and Star-RCXT™.

During physical verification (step 126), the design may be checked to ensure correctness for manufacturing, electrical issues, lithographic issues, and circuitry. Hercules™ is an exemplary EDA software product from Synopsys, Inc. that may be used at this step.

During resolution enhancement (step 128), geometric manipulations may be performed on the layout to improve manufacturability of the design. Exemplary EDA software products from Synopsys, Inc. that may be used at this step include Proteus/ProGen, ProteusAF, and PSMGen.

During mask data preparation (step 130), the design may be "taped-out" to produce masks that are used during fabrication.

Figure 2:
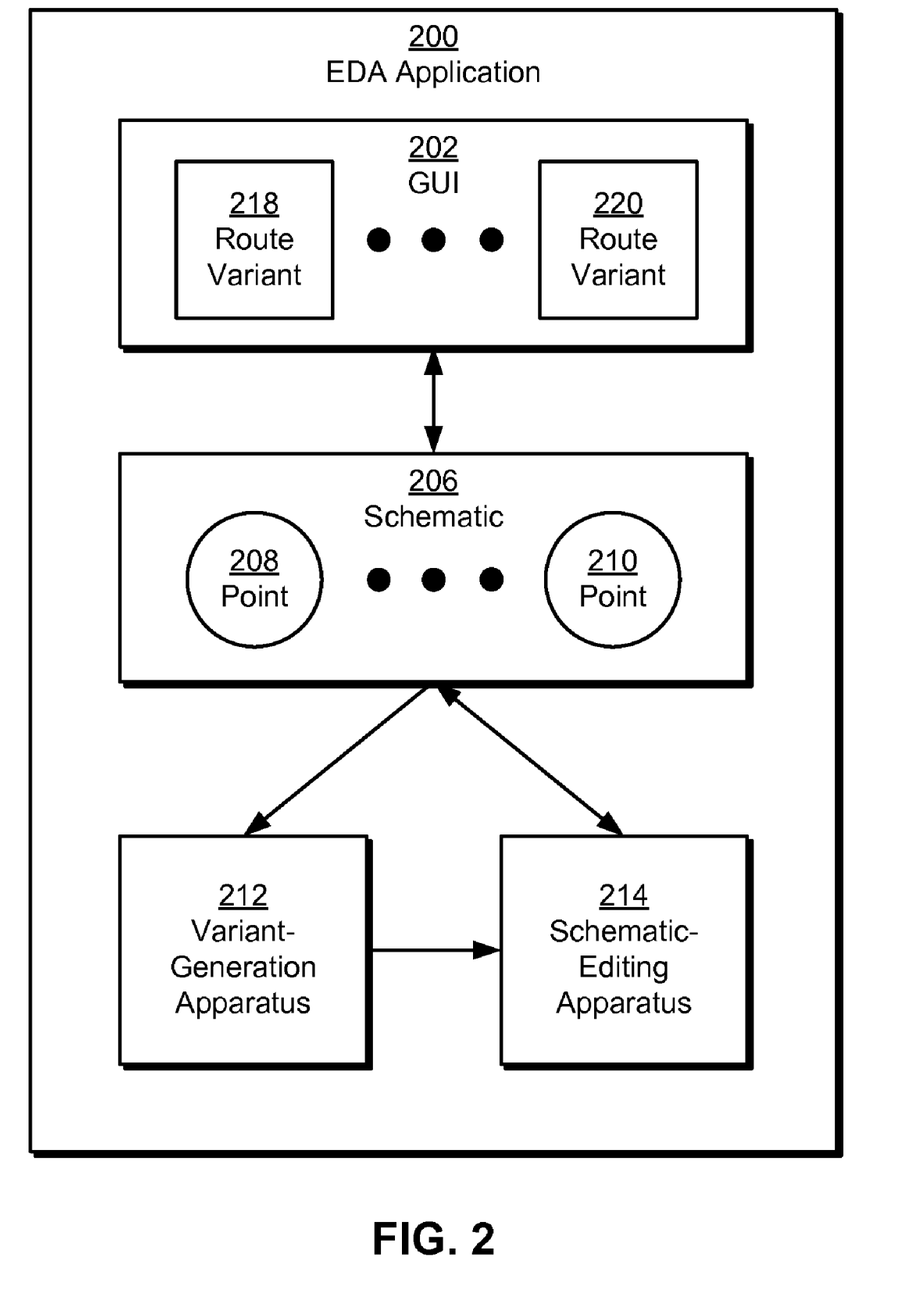
FIG. 2 shows an electronic design automation (EDA) application in accordance with an embodiment.

FIG. 2 shows an EDA application 200 in accordance with an embodiment. As shown in FIG. 2, EDA application 200 includes a graphical user interface (GUI) 202, a schematic 206, a variant-generation apparatus 212, and a schematic-editing apparatus 214. Each of these components is described in further detail below.

Schematic 206 may correspond to an abstract representation of an integrated circuit that uses graphical objects to represent components in the integrated circuit. For example, schematic 206 may contain symbols that represent resistors, capacitors, transistors, logic gates, and/or other components in the integrated circuit. The graphical objects may additionally be connected by lines that represent electrical couplings between the components. In other words, the functionality of the integrated circuit may be illustrated by the components and interconnections within schematic 206.

Furthermore, schematic 206 may be created using EDA application 200. In particular, schematic-editing apparatus 214 in EDA application 200 may include a number of interactive tools that allow a user to create schematic 206 on a computer system. For example, schematic-editing apparatus 214 may include mechanisms that allow the user to add graphical objects corresponding to integrated circuit components to schematic 206, as well as mechanisms for connecting the graphical objects with lines representing wires. The user may interact with schematic-editing apparatus 214 through GUI 202. For example, the user may view schematic 206 through GUI 202 and select graphical objects for inclusion in schematic 206 using a cursor (e.g., a mouse cursor) provided by GUI 202. The user may also position the graphical objects and draw lines between the graphical objects using the cursor.

To route wires between components in schematic 206, GUI 202 may obtain a sequence of points 208-210 from the user. Points 208-210 may include a source point and a destination point in schematic 206. Schematic-editing apparatus 214 may then connect the source point and destination point by generating a route between the two points. In addition, the user may provide one or more intermediate points between the start and destination points. If intermediate points are provided, schematic-editing apparatus 214 may generate the route from the source point to the destination point such that the route passes through the intermediate points in the order in which the intermediate points are specified. For example, the sequence of points 208-210 may include three intermediate points between the source point and destination point. Schematic-editing apparatus 214 may calculate the route by connecting the source point and the first intermediate point, the first intermediate point and the second intermediate point, the second intermediate point and the third intermediate point, and finally the third intermediate point and the destination point.

Those skilled in the art will appreciate that EDA tools may provide only one possible route between two points in schematic 206. For example, schematic-editing apparatus 214 may generate only one route between points 208-210 based on a set of heuristics and/or design rules associated with schematic 206 and/or EDA application 200. Moreover, the generated route may or may not be in line with the user's personal and/or design preferences. For example, the heuristics used by schematic-editing apparatus 214 to generate the route may conflict with the user's design preferences for creating schematic 206. As a result, the user may be restricted in the ability to choose routes in schematic 206 based on his/her preferences, or the user may be required to manually provide (e.g., draw) routes in schematic 206.

To facilitate the generation of routes in schematic 206 based on the user's preferences, EDA application 200 may include functionality to calculate multiple possible routes between a source point and a destination point in schematic 206. More specifically, variant-generation apparatus 212 may use a line-probe-search technique to generate a set of route variants 218-220 between the source and destination points.

In one or more embodiments, the line-probe-search technique used by variant-generation apparatus 212 radiates a set of initial probes from both the source point and the destination point. The initial probes may be radiated in cardinal directions from the source and destination points. In general, the probes can be radiated in any direction that is supported by the semiconductor design and manufacturing technology. Variant-generation apparatus 212 may also generate one or more sets of avoidance probes based at least on obstacles encountered by the initial probes. In other words, the generation of avoidance probes may be based on one or more factors that include obstacles encountered by the initial probes. The avoidance probes may be collinear to the intersecting edges of the obstacles. For example, avoidance probes may be generated perpendicularly from initial probes that encounter orthogonal obstacles.

Route variants 218-220 may then be generated using a set of intersections between the initial probes and avoidance probes. In particular, each route variant 218-220 may include an intersection between a first probe associated with the source point and a second probe associated with the destination point. Route variants 218-220 may also include intersections between two or more probes associated with the source point and/or two or more probes associated with the destination point. For example, each route variant 218-220 may include intersections at points where avoidance probes are generated from initial probes and/or other avoidance probes, as well as intersections between probes that encounter other probes associated with the same point (e.g., source point, destination point)

Because the intersection between the first probe and second probe may denote the joining of two or more paths formed by probes from both the source and destination points, a possible route between the source and destination points may be found whenever such an intersection exists. On the other hand, no possible routes between the source and destination points may exist if no intersections are found between probes associated with the source point and probes associated with the destination point. For example, no possible route may exist if the source and destination points are on either side of an obstacle that extends the length of schematic 206. Generation of route variants 218-220 using the line-probe-search technique is discussed in further detail below with respect to FIGS. 3A-3F.

Route variants 218-220 generated by variant-generation apparatus 212 may then be provided to the user through GUI 202. A selection of one of the route variants 218-220 may be then obtained from the user through GUI 202 and used as a route in schematic 206. In one or more embodiments, variant-generation apparatus 212 orders route variants 218-220 based at least on a cost associated with each of the route variants. The cost may be based on the length of the route variants, the number of turns in the route variants, and/or other criteria associated with the route variants. A subset of the ordered route variants may then be selected for display to the user through GUI 202. For example, five route variants associated with the lowest costs may be selected and displayed to the user. To view the selected route variants, the user may provide input to GUI 202 that causes GUI 202 to cycle through the route variants. For example, the user may press a key on a keyboard and/or select a button within GUI 202 using a cursor to view each of the route variants in order. After the user selects a route variant, schematic-editing apparatus 214 may use the selected route variant as the route between the source and destination points in schematic 206.

Figure 3A:
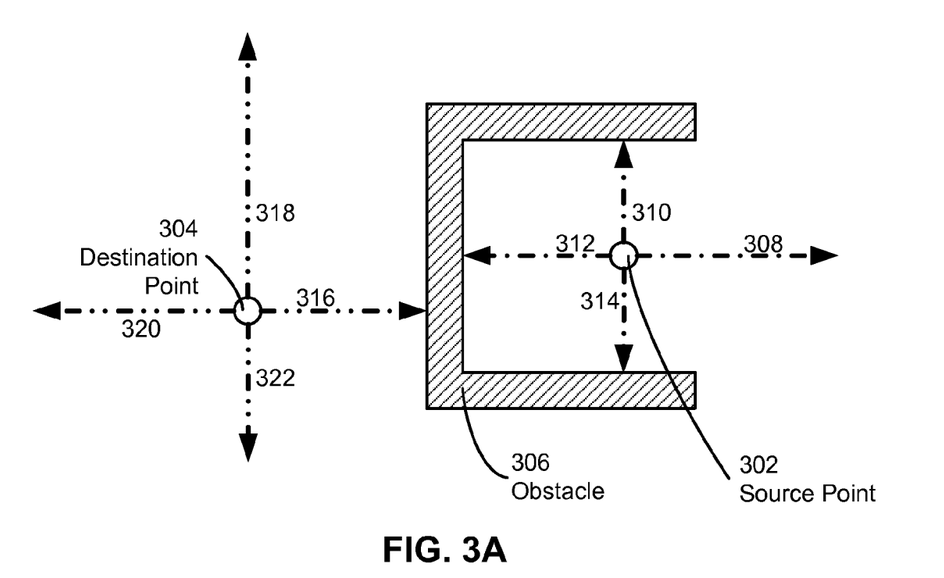
FIG. 3A shows a stage in a line-probe-search technique between a source point and a destination point in accordance with an embodiment.

FIG. 3A shows a stage in a line-probe-search technique between a source point 302 and a destination point 304 in accordance with an embodiment. As mentioned previously, the line-probe-search technique may be used to calculate a set of possible routes between source point 302 and destination point 304 in a schematic. Each of the possible routes may connect source point 302 and destination point 304 while avoiding an obstacle 306 between source point 302 and destination point 304.

To begin the line-probe-search technique, four initial probes 308-314 are radiated from source point 302, and four initial probes 316-322 are radiated from destination point 304. Moreover, initial probes 308-322 are radiated in cardinal directions from source point 302 and destination point 304 until the end of the schematic is reached and/or an obstacle (e.g., obstacle 306) is encountered. As shown in FIG. 3A, obstacle 306 is encountered by initial probes 310-316. As described below with respect to FIGS. 3B-3C, one or more sets of avoidance probes may be generated based at least on encounters between initial probes 310-316 and obstacle 306.

Figure 3B:
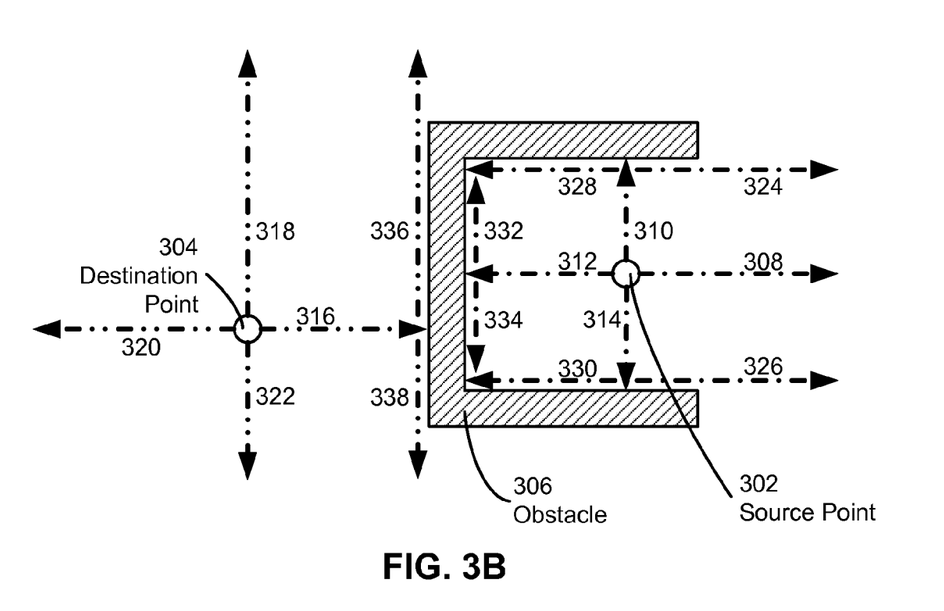
FIG. 3B shows a stage in a line-probe-search technique between a source point and a destination point in accordance with an embodiment.

FIG. 3B shows a stage in a line-probe-search technique between source point 302 and destination point 304 in accordance with an embodiment. In particular, FIG. 3B shows the generation of a first set of avoidance probes 324-338 from initial probes 310-316 that encounter obstacle 306. Avoidance probes 324-338 are generated collinearly from the edges of obstacle 306 encountered by initial probes 310-316 (e.g., perpendicularly from initial probes 310-316); as with initial probes 308-322, avoidance probes 324-338 may continue until obstacles (e.g., obstacle 306) and/or the end of the schematic are encountered.

Furthermore, the perpendicular generation of avoidance probes 324-338 from initial probes 310-316 may allow avoidance probes 324-338 to travel along the directional boundaries of obstacle 306 encountered by initial probes 310-316. Avoidance probes 324-338 may thus be used to determine the ends of the directional boundaries. An end of a boundary may be represented by a perpendicular change in the direction of the boundary. As a result, an avoidance probe may reach the end of a directional boundary by encountering a different directional boundary of obstacle 306 or by no longer detecting the boundary. For example, avoidance probes 328-334 may reach the ends of the directional boundaries along which avoidance probes 328-334 are traveling by encountering new directional boundaries that are perpendicular to the directional boundaries. On the other hand, avoidance probes 324-326 and 336-338 may reach the ends of their corresponding directional boundaries by no longer detecting the boundaries. In other words, avoidance probes 328-334 may end after encountering a new directional boundary of obstacle 306, while avoidance probes 324-326 and 336-338 may continue until the end of the schematic or a new boundary is encountered.

Figure 3C:
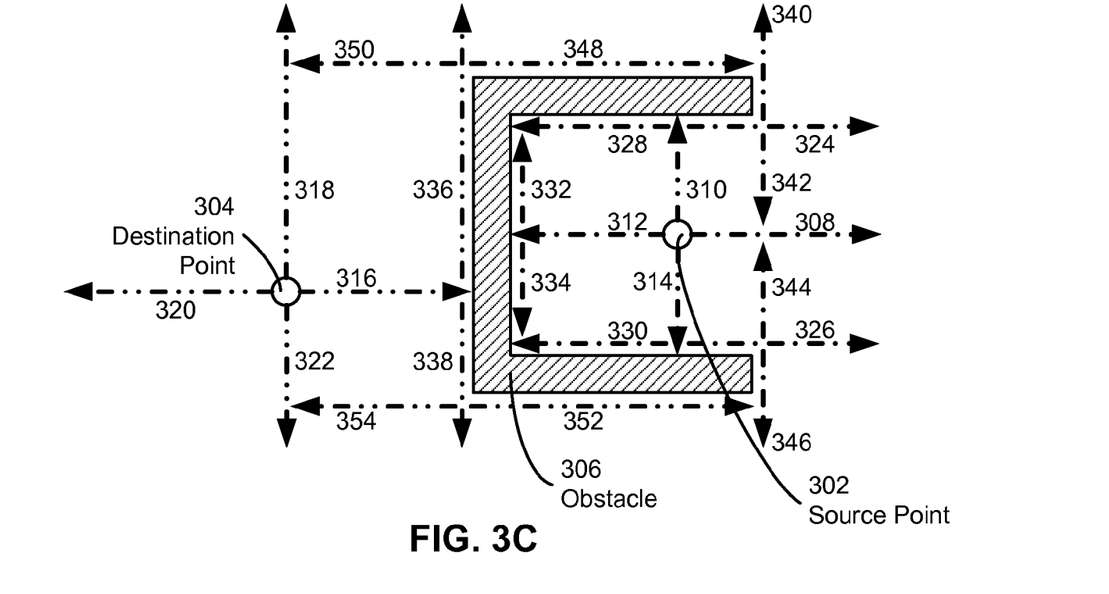
FIG. 3C shows a stage in a line-probe-search technique between a source point and a destination point in accordance with an embodiment.

FIG. 3C shows a stage in a line-probe-search technique between source point 302 and destination point 304 in accordance with an embodiment. As shown in FIG. 3C, a second set of avoidance probes 340-354 is generated from avoidance probes 324-326 and 336-338. Because avoidance probes 328-334 terminate at points that intersect with one another, avoidance probes 328-334 may form a continuous outline of a portion of obstacle 306, and the generation of additional avoidance probes from avoidance probes 328-334 is not required.

As with the first set of avoidance probes 324-338, the second set of avoidance probes 340-354 is generated in perpendicular directions from avoidance probes 324-326 and 336-338. Furthermore, avoidance probes 340-354 may be generated at the ends of directional boundaries detected and/or encountered by avoidance probes 324-338. Within probes associated with source point 302, avoidance probes 340-342 may be generated at the end of the directional boundary detected by avoidance probe 324, and avoidance probes 344-346 may be generated at the end of the directional boundary detected by avoidance probe 326. Within probes associated with destination point 304, avoidance probes 348-350 may be generated at the end of the directional boundary detected by avoidance probe 336, and avoidance probes 352-354 may be generated at the end of the directional boundary detected by avoidance probe 338.

Avoidance probes 340-354 may also continue traveling until obstacles (e.g. obstacle 306) and/or the end of the schematic are encountered. Avoidance probes 340-354 may also terminate if lines formed by other probes are encountered. For example, avoidance probe 348 may stop after encountering avoidance probe 340, avoidance probe 350 may stop after encountering avoidance probe 318, avoidance probe 352 may stop after encountering avoidance probe 346, and avoidance probe 354 may stop after encountering avoidance probe 322. Alternatively, the avoidance probes may continue past intersection points with other probes until obstacles corresponding to graphical objects in the schematic and/or the end of the schematic are encountered.

Furthermore, a number intersection points are made between probes associated with source point 302 and probes associated with destination point 304. Such intersection points may signify the existence of possible routes between source point 302 and destination point 304. In particular, two such intersection points exist between probes 340 and 348 and probes 346 and 352. Route variants between source point 302 and destination point 304 may be generated using paths along probes 308-354 that contain the intersection points. Route variants between source point 302 and destination point 304 are discussed below with respect to FIGS. 3D-3F.

To facilitate the calculation of route variants, additional probes may be generated from intersections between probes 308-354. For example, a probe may be generated from the intersection of probes 308 and 342 and radiated in the opposite direction of probe 342. The probe may then end after encountering probe 324. Similarly, a probe may be generated from the intersection of probes 318 and 350 in the opposite direction of probe 350 and may end after encountering probe 336. Such probes may correspond to shunt probes that reverse the directionality of probes that intersect other probes. Thus, shunt probes may enable the calculation of shorter and/or different route variants than route variants represented only by probes 308-354. For example, the shunt probe in the opposite direction of probe 342 may enable the creation of a route variant with fewer turns that begins with probe 308, follows the shunt probe, and then follows probe 340 instead of a route variant that begins with probe 310, follows probe 324, and then follows probe 340.

In one or more embodiments, the calculation of route variants begins between the selection of source point 302 and destination point 304 by a user. For example, the user may first select source point 302 with a cursor provided by a GUI before selecting destination point 304 with the cursor. As the user moves the cursor in the direction of destination point 304, initial probes 308-314 may be radiated from source point 302, and one or more sets of avoidance probes 324-334 and 340-326 may be generated from initial probes 308-314. In other words, a first set of probes may be generated upon obtaining source point 302 from the user, but before obtaining destination point 304 from the user.

After the user selects destination point 304, initial probes 316-322 and/or one or more sets of avoidance probes 336-338 and 348-354 may be generated from destination point 304. As a result, a second set of probes may be generated upon receiving destination point 304 from the user. The first and second sets of probes may then be used to determine the route variants between source point 302 and destination point 304. Because the first set of probes is generated before destination point 304 is specified, generation of route variants may occur faster using the first and second sets of probes than if initial probes 308-322 were radiated at the same time from source point 302 and destination point 304. Such preprocessing of route variants before destination point 304 is specified may improve performance associated with routing in large and/or complex schematics.

As the user moves the cursor from the source point to the destination point, the system may continuously or periodically generate route variants between the source point and the current location of the cursor. Since the source point is fixed, the system can reduce the cursor movement lag experienced by the user by re-using one or more probes in the line probe set.

Information associated with probes 308-354 may also be used to calculate route variants between other points in the schematic. For example, boundary information for obstacle 306 may be obtained from probes 308-354 and used to calculate route variants between two other points in the schematic. Consequently, generation of new route variants in the schematic may be facilitated by the reuse of obstacle and/or probe information obtained during the generation of previous route variants in the schematic.

Figure 3D:
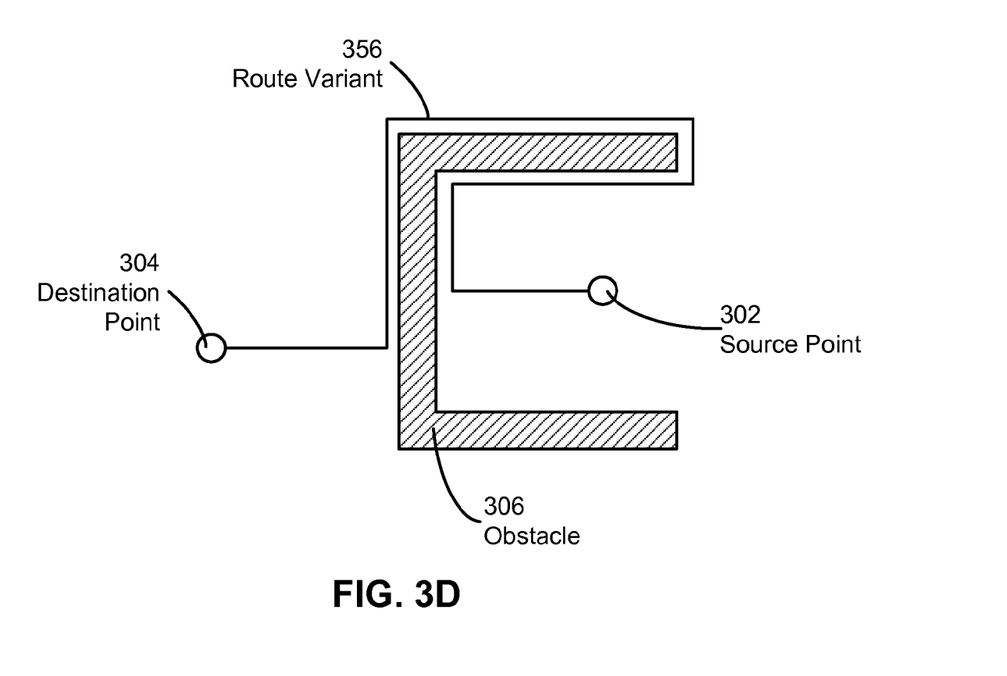
FIG. 3D shows a stage in a line-probe-search technique between a source point and a destination point in accordance with an embodiment.

FIG. 3D shows a route variant 356 between source point 302 and destination point 304 in accordance with an embodiment. As discussed above, the route variant may be determined using a set of intersections between initial probes 308-322 and avoidance probes 324-354 associated with source point 302 and destination point 304. Furthermore, one of the intersections must be between a first probe associated with source point 302 and a second probe associated with destination point 304. In particular, route variant 356 may include an intersection between probe 340 associated with source point 302 and probe 348 associated with destination point 304. Other intersections used to generate route variant 356 may include intersections between probes 312 and 332, probes 332 and 328, probes 328 and 324, probes 324 and 340, probes 348 and 336, and probes 336 and 316. Route variant 356 may also be generated using shunt probes. For example, route variant 356 may be calculated using a shunt probe that reverses the directionality of probe 328.

Figure 3E:
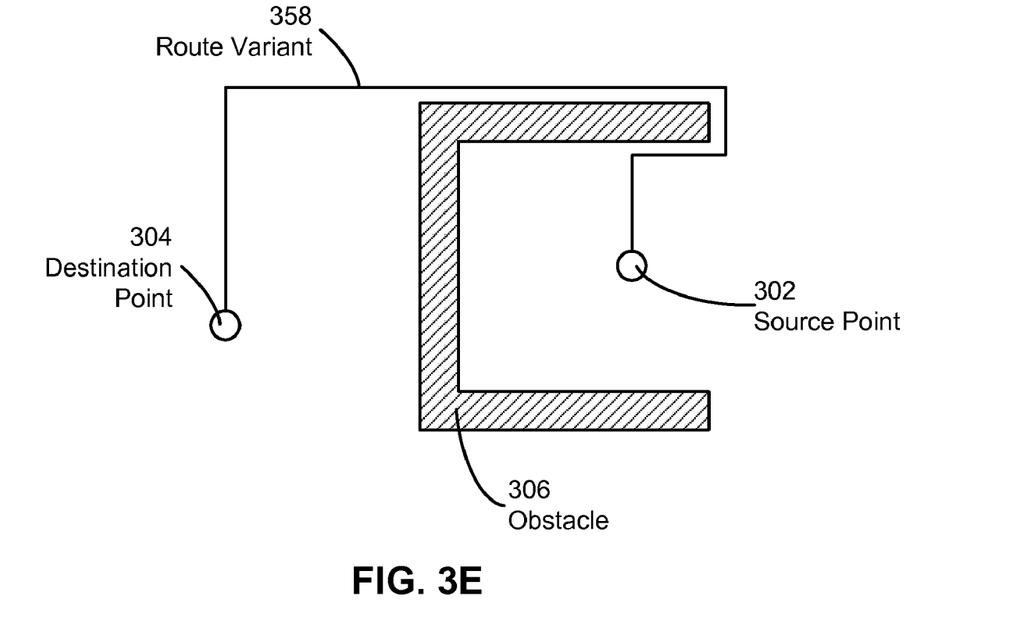
FIG. 3E shows a route variant between a source point and a destination point in accordance with an embodiment.

FIG. 3E shows a route variant 358 between source point 302 and destination point 304 in accordance with an embodiment. Route variant 358 also includes an intersection between probes 340 and 348. Other intersections used to create route variant 358 may include intersections between probes 310 and 324, probes 324 and 340, probes 348 and 350, and probes 350 and 318.

Figure 3F:
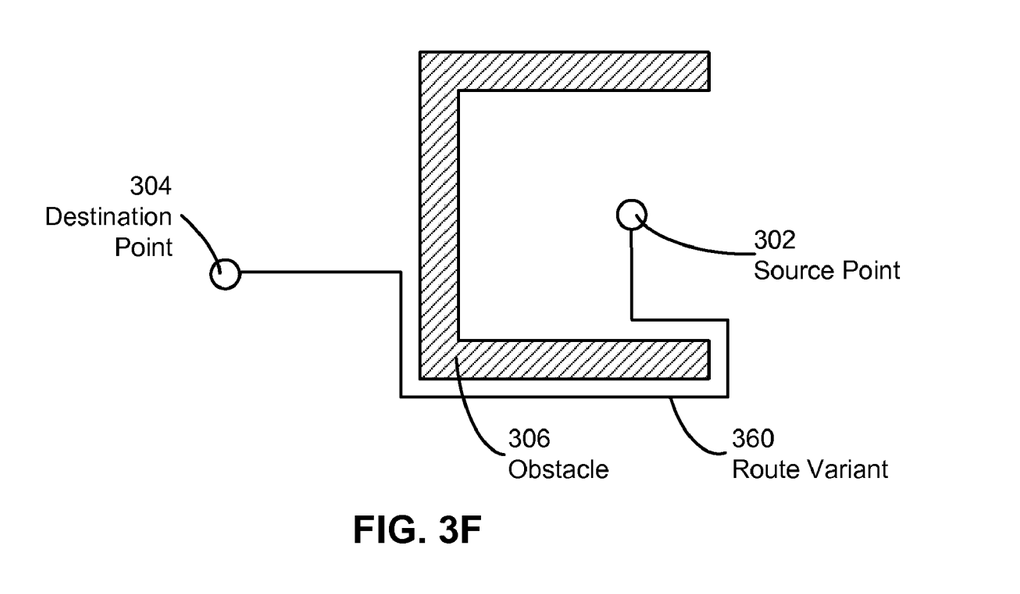
FIG. 3F shows a route variant between a source point and a destination point in accordance with an embodiment.

FIG. 3F shows a route variant 360 between source point 302 and destination point 304 in accordance with an embodiment. Unlike route variants 356-358, route variant 360 contains an intersection between probe 346 associated with source point 302 and probe 352 associated with destination point 304. Other intersections used to create route variant 360 may include intersections between probes 314 and 326, probes 326 and 346, probes 352 and 338, and probes 338 and 316.

As mentioned previously, route variants 356-360 may be provided to a user as possible routes between source point 302 and destination point 304. The user may then select one of the route variants as the route between source point 302 and destination point 304. For example, the user may select route variant 356 because route variant 356 runs along the boundary of obstacle 306. On the other hand, the user may select route variant 360 because route variant 360 runs along the bottom of obstacle 306 instead of along the top of obstacle 306. Finally, the user may select route variant 358 because route variant 358 contains the fewest number of turns. In other words, the user may choose a route variant 356-360 as the route based on a set of personal and/or design preferences for the schematic.

Figure 4:
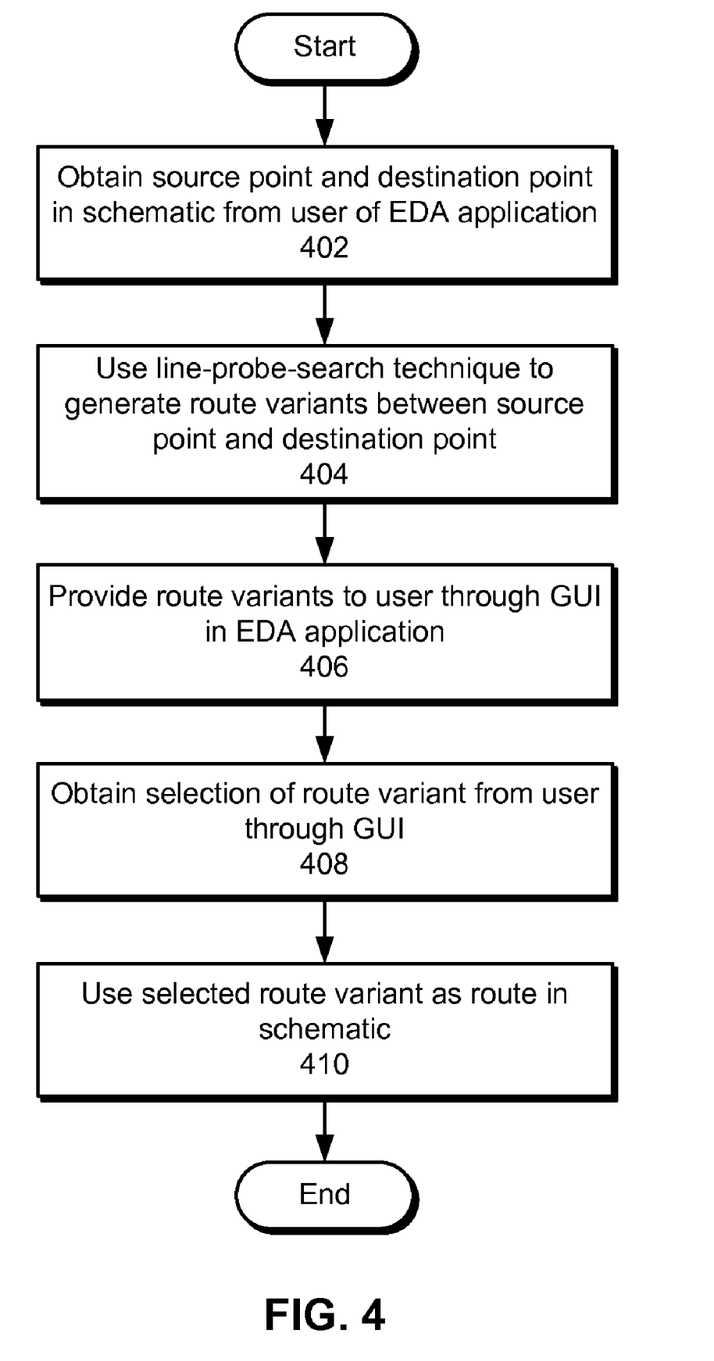
FIG. 4 shows a flowchart illustrating the process of facilitating the creation of a schematic in an EDA application in accordance with an embodiment.

FIG. 4 shows a flowchart illustrating the process of facilitating the creation of a schematic in an EDA application in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

Initially, a source point and a destination point in the schematic are obtained from a user of the EDA application (operation 402). The source and destination points may be selected to generate a route between the two points. Next, a line-probe-search technique is used to generate a set of route variants between the source point and the destination point (operation 404). Each of the route variants may contain a different path between the source point and the destination point.

The route variants are then provided to the user through a GUI in the EDA application (operation 406). For example, the route variants may be ordered based at least on a cost associated with each of the route variants, and a subset of the ordered variants associated with the five lost costs may be displayed to the user. The user may cycle through the route variants by pressing a key, selecting a button, and/or providing other input through the GUI.

A selection of a route variant from the route variants is also obtained from the user through the GUI (operation 408). The selection may be based on the user's personal and/or design preferences. For example, the user may prefer a shorter route, a route with fewer turns, and/or a route that runs along obstacle boundaries. Finally, the selected route variant is used as a route in the schematic (operation 410).

Figure 5:
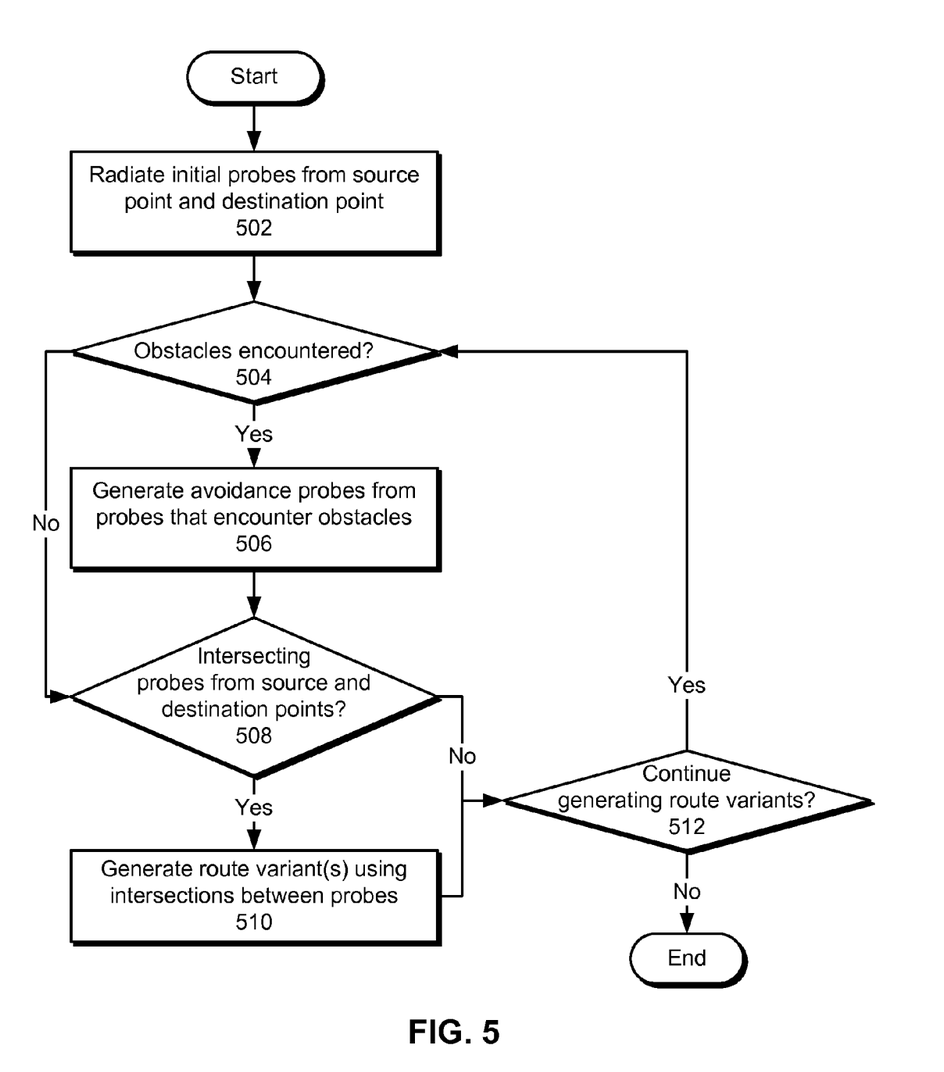
FIG. 5 shows a flowchart illustrating a line-probe-search technique in accordance with an embodiment.

FIG. 5 shows a flowchart illustrating a line-probe-search technique in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

First, a set of initial probes is radiated from a source point and a destination point (operation 502). The initial probes may be radiated in cardinal directions from the source and destination points. The initial probes may also encounter obstacles (operation 504). If obstacles are encountered, avoidance probes are generated from the initial probes that encounter obstacles (operation 506). The avoidance probes may be generated collinearly from the edges of the obstacle(s) encountered by the initial probes and travel along the directional boundaries of the obstacles encountered by the initial probes. As a result, each avoidance probe may detect the end of a directional boundary as the presence of a different directional boundary or as a lack of the directional boundary.

Probes from the source and destination points may also intersect (operation 508), particularly if no obstacles are encountered by the initial probes. If intersections exist between probes associated with the source point and probes associated with the destination point, one or more route variants may be generated using the intersections (operation 510). The route variants may trace paths between the source and destination points that are formed from intersections associated with the initial probes and/or avoidance probes.

The generation of route variants may then continue (operation 512) with the generation of additional probes. For example, additional probes may be generated if no intersections are found between probes associated with the source point and probes associated with the destination point, or if additional route variants are to be generated between the source and destination points.

If generation of route variants is to continue, the newest set of probes is examined for encounters with obstacles (operation 504). If obstacles are encountered, another set of avoidance probes is generated from the probes that encounter obstacles (operation 506). Intersections may also be produced between probes associated with the source point and probes associated with the destination point (operation 508). If such intersections exist, route variants are generated using the intersections (operation 510).

Generation of probes and route variants from the probes may continue (operation 512) until a specified number of route variants are produced and/or the probes are unable to produce a possible route between the source point and the destination point. For example, the probes may be unable to connect the source and destination points if an obstacle spanning an entire dimension of the schematic lies between the source point and the destination point.

As described above, generation of probes from the source point may occur before the destination point is specified. For example, a first set of probes associated with the source point may be generated upon receiving the selection of the source point from a cursor. As the cursor is moved toward the destination point, the first set of probes may continue to be generated to explore the area around the source point. After the destination point is obtained, a second set of probes associated with the destination point is generated. The first and second sets of probes may then be used to determine the route variants.

Consequently, the creation of initial and avoidance probes in operations 502-506 may occur at separate times for the source and destination points. Furthermore, the earlier creation of the first set of probes may allow route variants to be calculated between the source and destination points at a faster rate than if initial probes were generated from both points at the same time. The calculation of route variants between the source and destination points may further be facilitated by obstacle and/or probe information obtained during the generation of previous route variants. For example, probes generated during the calculation of previous route variants between other points may be reused in the generation of route variants between the source and destination points.

Figure 6:
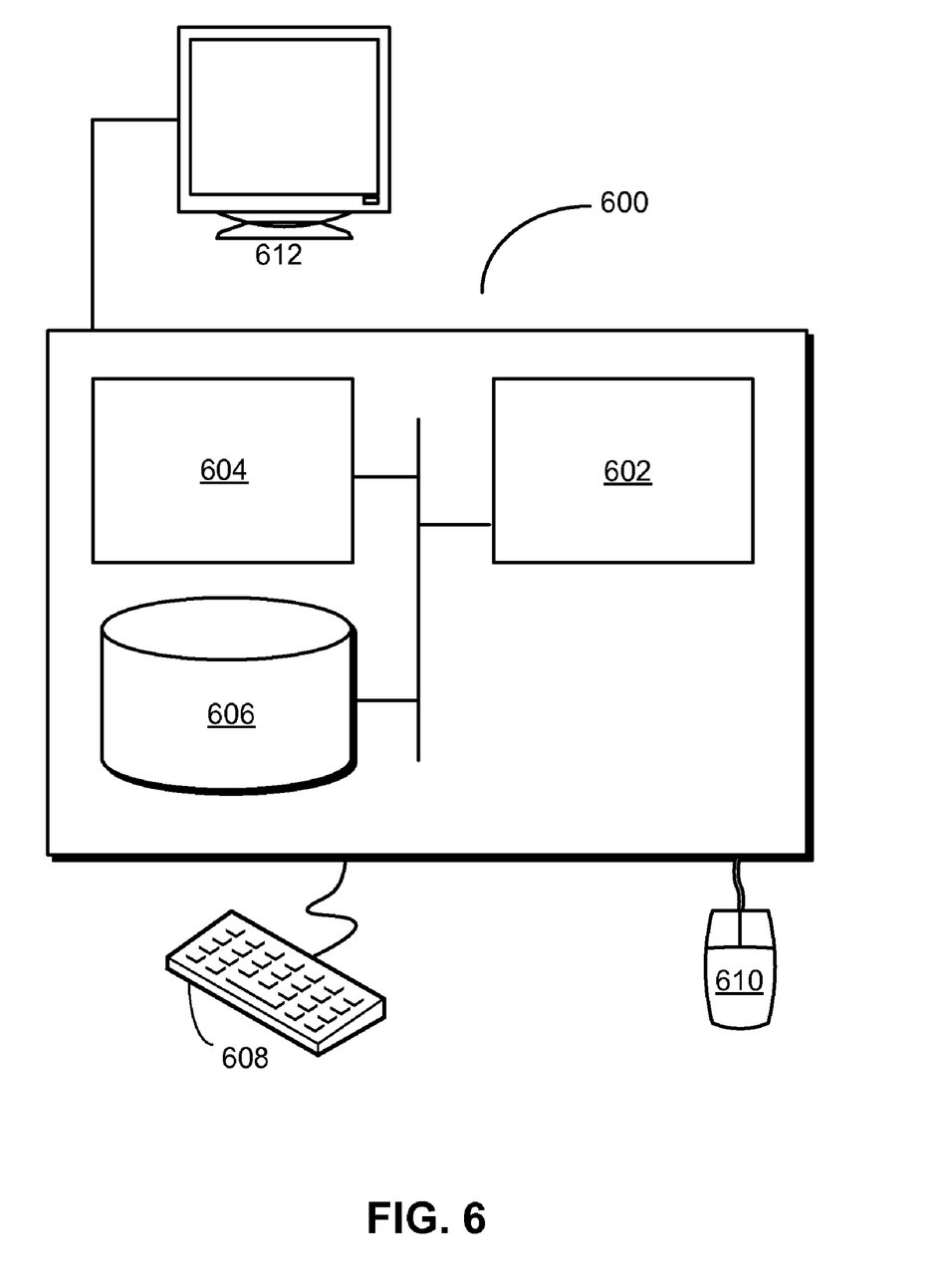
FIG. 6 shows a computer system in accordance with an embodiment.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating the creation of a schematic in an EDA application. The system may include a GUI that obtains a source point and a destination point in the schematic from a user of the EDA application. The system may also include a variant-generation apparatus that uses a line-probe-search technique to generate a set of route variants between the source point and the destination point. The GUI may then provide the route variants to the user and obtain a selection of a route variant from the user. Finally, the system may include a schematic-editing apparatus that uses the selected route variant as a route in the schematic.

In addition, one or more components of computer system 600 may be remotely located and may communicate with the other components over a network. Portions of the present embodiments (e.g., GUI, variant-generation apparatus, schematic-editing apparatus, etc.) may also be located on different nodes of a distributed system that implements the embodiments. For example, the present embodiments may be implemented using a cloud computing system that enables the creation of layouts on a remote EDA application.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the creation of a schematic in an electronic design automation (EDA) application, comprising:
   obtaining a source point and a destination point in the schematic from a user of the EDA application;
   using a line-probe-search technique to generate, by computer, a set of route variants between the source point and the destination point, wherein using the line-probe-search technique to generate the route variants involves:
      radiating a set of initial probes from the source point and the destination point;
      generating one or more sets of avoidance probes based at least on obstacles encountered by the initial probes;
      determining a set of intersections associated with the initial probes and the avoidance probes; and
      generating the route variants using the intersections;
   providing the route variants to the user through a graphical user interface (GUI) in the EDA application;
   obtaining, from the user, a selection of a route variant from the route variants through the GUI; and
   using the selected route variant as a route in the schematic.

2. The computer-implemented method of claim 1, wherein each of the route variants contains an intersection from the intersections between a first probe associated with the source point and a second probe associated with the destination point.

3. The computer-implemented method of claim 1, wherein the initial probes are radiated in cardinal directions from the source point and the destination point.

4. The computer-implemented method of claim 3, wherein the avoidance probes are generated perpendicularly from the initial probes that encounter the obstacles.

5. The computer-implemented method of claim 1,
   wherein the source point is obtained from the user prior to the destination point, and
   wherein using the line-probe-search technique to generate the set of route variants further involves:
      generating a first set of probes associated with the source point upon obtaining the source point, but before receiving the destination point;

generating a second set of probes associated with the destination point upon receiving the destination point; and using the first set of probes and the second set of probes to determine the route variants.

6. The computer-implemented method of claim 1, wherein providing the route variants to the user through the GUI involves:

cycling through the route variants within the GUI based at least on input from the user.

7. The computer-implemented method of claim 1, wherein providing the route variants to the user through the GUI involves:

ordering the route variants based at least on a cost associated with each of the route variants; and displaying a subset of the ordered route variants to the user.

8. A system for facilitating the creation of a schematic in an electronic design automation (EDA) application, comprising:

a variant-generation apparatus configured to use a line-probe-search technique to generate a set of route variants between a source point and a destination point in the schematic, wherein using the line-probe-search technique to generate the route variants involves:

radiating a set of initial probes from the source point and the destination point;

generating one or more sets of avoidance probes based at least on obstacles encountered by the initial probes;

determining a set of intersections associated with the initial probes and the avoidance probes; and generating the route variants using the intersections;

a graphical user interface (GUI) configured to:

obtain the source point and the destination point from a user of the EDA application;

provide the route variants to the user; and obtaining, from the user, a selection of a route variant from the route variants; and a schematic-editing apparatus configured to use the selected route variant as a route in the schematic.

9. The system of claim 8, wherein each of the route variants contains an intersection from the intersections between a first probe associated with the source point and a second probe associated with the destination point.

10. The system of claim 8, wherein the initial probes are radiated in cardinal directions from the source point and the destination point.

11. The system of claim 10, wherein the avoidance probes are generated perpendicularly from the initial probes that encounter the obstacles.

12. The system of claim 8, wherein the source point is obtained from the user prior to the destination point, and wherein using the line-probe-search technique to generate the set of route variants further involves:

generating a first set of probes associated with the source point upon obtaining the source point, but before receiving the destination point;

generating a second set of probes associated with the destination point upon receiving the destination point; and using the first set of probes and the second set of probes to determine the route variants.

13. The system of claim 8, wherein providing the route variants to the user through the GUI involves:

cycling through the route variants within the GUI based at least on input from the user.

14. The system of claim 8, wherein providing the route variants to the user through the GUI involves:

ordering the route variants based at least on a cost associated with each of the route variants; and displaying a subset of the ordered route variants to the user.

15. A non-transitory computer-readable storage medium storing instructions that when executed by a computer cause the computer to perform a method for facilitating the creation of a schematic in an electronic design automation (EDA) application, the method comprising:

obtaining a source point and a destination point in the schematic from a user of the EDA application;

using a line-probe-search technique to generate a set of route variants between the source point and the destination point, wherein using the line-probe-search technique to generate the route variants involves:

radiating a set of initial probes from the source point and the destination point;

generating one or more sets of avoidance probes based at least on obstacles encountered by the initial probes;

determining a set of intersections associated with the initial probes and the avoidance probes; and generating the route variants using the intersections;

providing the route variants to the user through a graphical user interface (GUI) in the EDA application;

obtaining, from the user, a selection of a route variant from the route variants through the GUI; and using the selected route variant as a route in the schematic.

16. The non-transitory computer-readable storage medium of claim 15, wherein each of the route variants contains an intersection from the intersections between a first probe associated with the source point and a second probe associated with the destination point.

17. The non-transitory computer-readable storage medium of claim 15, wherein the initial probes are radiated in cardinal directions from the source point and the destination point.

18. The non-transitory computer-readable storage medium of claim 17, wherein the avoidance probes are generated perpendicularly from the initial probes that encounter the obstacles.

19. The non-transitory computer-readable storage medium of claim 15, wherein the source point is obtained from the user prior to the destination point, and wherein using the line-probe-search technique to generate the set of route variants further involves:

generating a first set of probes associated with the source point upon obtaining the source point, but before receiving the destination point;

generating a second set of probes associated with the destination point upon receiving the destination point; and using the first set of probes and the second set of probes to determine the route variants.

20. The non-transitory computer-readable storage medium of claim 15, wherein providing the route variants to the user through the GUI involves:

cycling through the route variants within the GUI based at least on input from the user.

21. The non-transitory computer-readable storage medium of claim 15, wherein providing the route variants to the user through the GUI involves:

ordering the route variants based at least on a cost associated with each of the route variants; and displaying a subset of the ordered route variants to the user.

* * * * *